B. P. GRAY.
COMBINED HORSESHOE AND PAD.
APPLICATION FILED JUNE 8, 1907.
925,631.
Patented June 22, 1909.
2 SHEETS—SHEET 1.
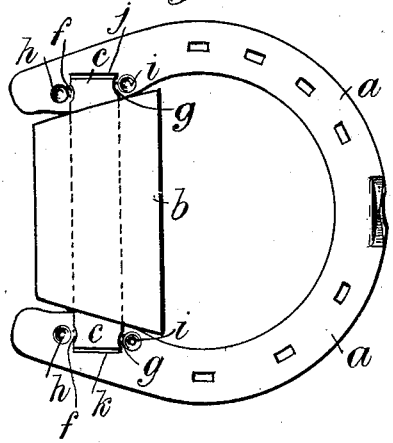
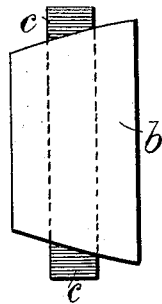
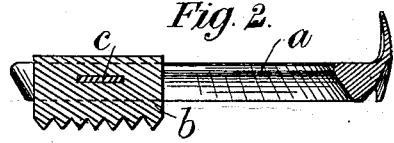
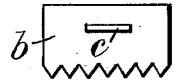
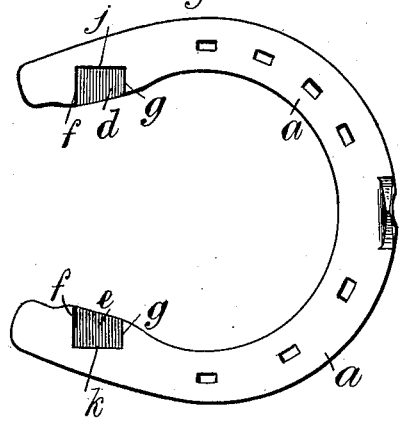
Witnesses.
W. P. Burk
M Petit
Inventor
Bertram Parrott Gray

UNITED STATES PATENT OFFICE.

BERTRAM PARROTT GRAY, OF BIRMINGHAM, ENGLAND.

COMBINED HORSESHOE AND PAD.

No. 925,631.  Specification of Letters Patent.  Patented June 22, 1909.

Application filed June 8, 1907. Serial No. 377,935.

*To all whom it may concern:*

Be it known that I, BERTRAM PARROTT GRAY, a subject of His Majesty the King of Great Britain and Ireland, residing at 43 Summer Row, Birmingham, England, solicitor, have invented new and useful Improvements in a Combined Horseshoe and Pad, of which the following is a specification.

This invention consists of the herein described combined horseshoe and pad in which the indiarubber pad is permanently fixed to the shoe and is not removable without removing the shoe from the hoof.

At the present time hoof pads for horses are commonly made with a leather or indiarubber flange or top part which is placed between the hoof and the shoe and is nailed on with the shoe. Some other forms of hoof pads are made detachable so that they can be removed from and replaced on the hoof without disturbing the shoe. When the hoof pad is made in the form of what is known as a strip pad, that is, in the form of an indiarubber strip or bar which stretches across the hoof at the heel part of the shoe, the frog can be washed without removing the pad from the hoof.

According to this invention the hoof pad, whether made as a strip pad or so as to cover the frog, is permanently fixed to the shoe by the means and in the manner which I will describe by referring to the accompanying drawings on which—

Figure 8:
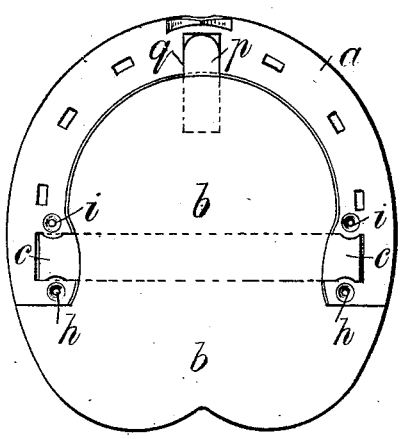
Figure 9:
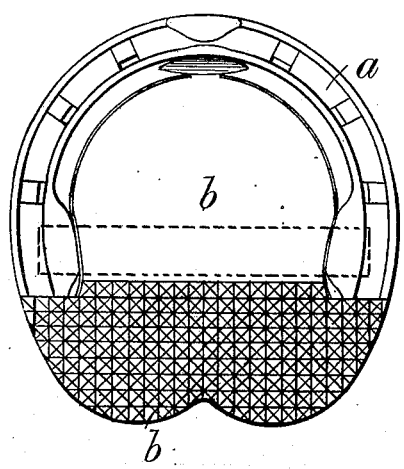
Figure 10:
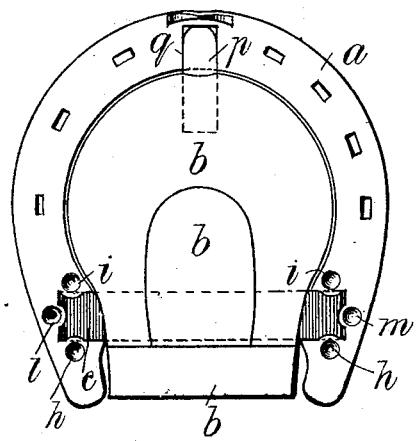
Figure 11:
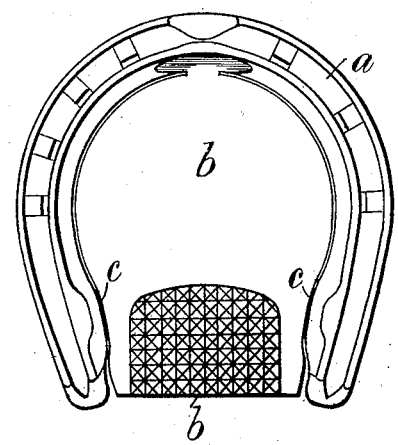

Figure 1 is a plan of a combined horseshoe and strip pad with the latter fixed to the shoe in accordance with this invention; Fig. 2 is a sectional side elevation of the same; Fig. 3 is a sectional side elevation of the shoe before the pad has been secured thereto; Fig. 4 is a plan of the said shoe without the pad; Fig. 5 is a plan of the said pad and Fig. 6 is a side elevation of the same; Fig. 7 is a cross section of a modified form of cross bar for the pad; Fig. 8 is a plan of a combined horse shoe and bar pad in accordance with this invention; Fig. 9 is an inverted plan of the same; Fig. 10 is a plan of a combined horse shoe and indiarubber pad covering the frog, the said pad being permanently fixed to the shoe in accordance with this invention; and Fig. 11 is an inverted plan of the combined horse shoe and pad shown by Fig. 10.

The same reference letters indicate the same or corresponding parts in all the figures.

$a$ is the shoe and $b$ is the indiarubber pad.

In carrying out this invention the indiarubber pad $b$ is permanently fixed to the shoe $a$ by a flat section or other cross-bar $c$ which passes transversely through a hole in the indiarubber pad $b$ (or on to which the indiarubber pad is molded and formed) and the ends of this cross-bar $c$ project at the sides of the pad $b$ and these projecting ends are permanently fixed to the shoe $a$ by the ends of the cross-bar $c$ fitting in recesses or depressions $d$, $e$, in the top part of the shoe near the heel said recesses extending from the inner edges of the shoe substantially half-way across the width of the shoe so as to form these rectangular notches $d$ and $e$ and here the sides $f$, $g$, of these depressions $d$, $e$, are hammered and spread over the end portions of the cross-bar $c$ thereby securing the cross-bar $c$ and pad $b$ and shoe $a$ together. The spreading and hammering over of the sides $f$, $g$, of the recesses $d$, $e$, over the sides of the end portions of the cross-bar $c$ can readily be effected while the shoe $a$ is cold by a center punch or the like being hammered on to the top of the shoe $a$ at the sides of the depressions $d$, $e$, so as to form impressions $h$, $i$, and spread the metal over the edges of the cross bar $c$ as aforesaid and as shown in Figs. 1, 8 and 10. The depressions $d$, $e$, in the shoe in the ends of which the metal cross bar $c$ fit are by preference not made right across the shoe but as shown in Figs. 1, 4, 8 and 10 are stopped off at some little distance from the outside of the edge of the shoe so as to form stops $j$, $k$, against the ends of the cross bar $c$ and prevent the same from moving endwise. These ends or stops $j$, $k$, can if desired be hammered and closed over the ends of the cross bar $c$ at $l$, $m$ so as to make the said cross bar more secure.

The cross bar $c$ can most cheaply and effectually be made of an ordinary rectangular shape in cross section as in Fig. 6 but if desired the said cross bar may, as shown in Fig. 7 be made with inclined top edges $n$, $o$ so as to be somewhat of a dovetailed shape in cross section inclining outwardly toward the bottom so that when the sides $f$, $g$, of the recesses $d$, $e$, are hammered over these inclined edges $n$, $o$, of the cross bar they will have a better hold on the side edges of the cross bar than they would have when the cross bar is made of an ordinary rectangular shape as in Fig. 6.

When the pad $b$ is, as in Figs. 8, 9, 10 and 11, made to cover the frog then the toe part of the pad may as in some other hoof pads be provided with a small metal bar $p$ projecting from it and taking into a corresponding recess $q$ in the toe part of the shoe.

I find in practice that one cross bar $c$ is sufficient to properly secure the pad to the shoe but it is to be understood that if desired two or more of the said cross bars may be similarly employed in one pad without departing from the nature of my said invention.

The pad $b$ may be made of indiarubber, or india rubber composition, or other suitable substance, with or without a leather top piece as hoof pads are now made.

What I claim as my invention and desire to secure by Letters Patent is:—

1. In a horseshoe having a recess in its upper surface in each heel portion, said recess extending from the inner surface to a point one-half the width of the heel portion of the shoe so as to form a rectangular notch, an india-rubber hoof pad, a cross-bar passing through said pad having its ends projecting therefrom and adapted to fit in said recesses, the edges of said recesses being hammered over the end of the cross-bar to secure the same to the shoe.

2. In a horseshoe having a recess in its upper surface in each heel portion, said recess extending from the inner surface to a point one-half the width of the heel portion of the shoe so as to form a rectangular notch, an india-rubber hoof pad, a cross-bar passing through said pad having its ends projecting therefrom and adapted to fit in said recesses, the edges of said recesses being hammered over the end of the cross-bar to secure the same to the shoe, the said shoe having a third recess in its toe portion extending at right angles to the recesses in the heel portion, and a plate secured in the rubber pad and entering said third recess.

In testimony whereof I have signed my name to this specification in the presence of two subscribing witnesses.

BERTRAM PARROTT GRAY.

Witnesses:
CHARLES BOSWORTH KETLEY,
THOMAS JOHN ROWE.